United States Patent [19]
Shiao

[11] Patent Number: 6,077,322
[45] Date of Patent: *Jun. 20, 2000

[54] RETARDATION OF DISPERSION OF BITUMEN-IN-WATER EMULSIONS

[75] Inventor: Shih-Yung Shiao, Stow, Ohio

[73] Assignee: The Babcock & Wilcox Company, New Orleans, La.

[ * ] Notice: This patent issued on a continued prosecution application filed under 37 CFR 1.53(d), and is subject to the twenty year patent term provisions of 35 U.S.C. 154(a)(2).

[21] Appl. No.: 08/909,499

[22] Filed: Aug. 12, 1997

[51] Int. Cl.$^7$ ................ C10L 1/32; B01J 13/00
[52] U.S. Cl. ............ 44/301; 210/923; 210/925; 516/27; 516/43; 516/102; 516/925; 516/928
[58] Field of Search ............ 252/311.5; 106/277; 516/43, 928, 102, 27, 925; 44/301; 210/923, 925

[56] References Cited

U.S. PATENT DOCUMENTS

| | | | |
|---|---|---|---|
| 2,378,235 | 6/1945 | Miles | 252/311.5 X |
| 3,126,350 | 3/1964 | Borgfeldt | 252/311.5 |
| 3,383,229 | 5/1968 | Conort | 516/43 X |
| 3,445,258 | 5/1969 | Ferm et al. | 252/311.5 X |
| 3,490,237 | 1/1970 | Lissant | 44/301 X |
| 4,370,170 | 1/1983 | Tolonen et al. | 106/277 |
| 4,455,149 | 6/1984 | Satake et al. | 252/311.5 X |
| 4,462,840 | 7/1984 | Schilling et al. | 252/311.5 X |
| 4,976,745 | 12/1990 | Rodriguez et al. | 516/43 X |
| 5,935,445 | 8/1999 | Febres | 210/923 X |
| 5,935,447 | 8/1999 | Febres et al. | 210/923 X |

FOREIGN PATENT DOCUMENTS 0 030 476  3/1978  Japan ................ 210/925

*Primary Examiner*—Richard D. Lovering
*Attorney, Agent, or Firm*—Robert J. Edwards; Daniel S. Kalka

[57] ABSTRACT

Methods and additive compounds for retarding the dispersion in water of bitumen-in-water emulsions, and in particular ORIMULSION, are disclosed. Methods include applied mixing at high speed and changing the pH of the emulsion. Additives include salts and flocculants.

10 Claims, No Drawings

RETARDATION OF DISPERSION OF BITUMEN-IN-WATER EMULSIONS

BACKGROUND OF THE INVENTION

1. Field of the Invention

The present invention relates generally to the field of fossil fuels and in particular to methods and compounds for increasing the viscosity and reducing the dispersion of bitumen-in-water emulsions following spills or leaks, and specifically with regard to a bitumen-in-water emulsion known as ORIMULSION, produced by and a trademark of Petroleos di Venezuela.

2. Description of the Related Art

ORIMULSION is a well-known alternative fossil fuel that can be combusted by industrial power plants which have been modified for the fuel. See, for example, Makansi, J., "Manatee Lays Groundwork for Commercial Use of Orimulsion," Power, September 1994, pp. 57–60; Makansi, J., "New Fuel Could Find Niche Between Oil, Coal," Power, December 1991, pp. 51–56. ORIMULSION consists of approximately 70% bitumen droplets dispersed in about 30% water, with a small amount of surfactant added to stabilize the emulsion. Bitumen is an extra heavy crude oil with an API gravity density of less than 8°. ORIMULSION is much less viscous than bitumen, and as a result, ORIMULSION may be transported by conventional pipelines and in tankers. For a particular sample tested, the pH of ORIMULSION is about 8.09, the density is about 0.995 and the wt % moisture of ORIMULSION is about 32.65.

A significant concern with the use and transport of ORIMULSION is that it is readily dispersable in water. Thus, if spills occur on land or at sea, the ORIMULSION can quickly spread over a large area in a short time, rapidly causing greater environmental damage.

It has been reported that when the ORIMULSION dispersion is reversed, that is, to a water-in-bitumen mixture (water droplets dispersed in bitumen), it has a viscosity near to that of bitumen. The following conditions may cause this inversion, or reversal, in ORIMULSION:
1) exposure to temperatures exceeding 176° F.; 2) sudden pressure drop exceeding 100 psi; 3) centrifugal pump shearing at greater than 1800 rpm; and 4) mixing with greater than 1% #6 oil, which can occur during fuel switching.

Since ORIMULSION is a multi-component, two-phase system, this type of emulsion and its physical properties can be changed by changing the composition of the components, adding other chemicals, or changing the conditions surrounding the system.

SUMMARY OF THE INVENTION

It is an object of the present invention to provide a method (or methods) for reducing the dispersion of bitumen-in-water emulsions, and in particular of ORIMULSION.

It is a further object of the present invention to provide compounds for modifying the physical properties of bitumen-in-water emulsions, and in particular ORIMULSION, such that the emulsion is less prone to dispersion in water.

Accordingly, methods and compounds for lessening the dispersion in water of ORIMULSION are provided herein. Methods for retarding ORIMULSION dispersion in water include applied mixing, and decreasing the pH. Adding one or more compounds, including oil, solvents, surfactants, salts and flocculants. Additive compounds include $CaCl_2$ and $FeCl_3$ inorganic salts, and BETZ (a registered trademark of Betz Laboratories) 3395, 3367L and 3317L flocculants.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter in which a preferred embodiment of the invention is illustrated.

DESCRIPTION OF THE PREFERRED EMBODIMENTS

Several methods for retarding the dispersion of a specific bitumen-in-water emulsion, ORIMULSION, were tested using shear viscosity measurements. A Haake Rotovisco viscometer was used to determine the shear viscosity of the ORIMULSION following application of the method under test. In each case, the shear rate was raised from 0 to 100 $sec^{-1}$ in a fixed time period, then held constant for a second fixed time period, and then reduced to zero again in a third fixed time period. Except for tests on the effect of temperature, the temperature of the ORIMULSION was maintained at 25° C.

A reference sample of ORIMULSION was tested first according to the test method described. The viscosity of the reference sample was found to be 293 centipoise at a shear rate of 100 $sec^{-1}$ and temperature of 25° C. It was discovered that ORIMULSION is thixotropic in nature. That is, the shear stress decreases at a constant shear rate. And, it has a pseudo-plastic characteristic as well, as the shear stress increased in a less than linear manner as the shear rate was increased.

The methods tested for retarding the dispersion of ORIMULSION by increasing the viscosity included shearing, or mixing the emulsion at 300 rpm for 4 hours, lowering the pH of the emulsion and adding one of several additive compounds. Additive compounds and the approximate weight percent added to the ORIMULSION which were tested included Kerosene (1.4 wt % to 4.2 wt %), TRITON RW-20, a registered trademark of Rohm and Haas, cationic surfactant (1.4 wt %), calcium chloride ($CaCl_2$) (0.2 wt % to 2.8 wt %), iron chloride ($FeCl_3$) (1.4 wt %), and three Betz flocculants—Betz 3395, Betz 3367L and Betz 3317L (all 1.4 wt %). The following table summarizes the test results.

TABLE 1

| Method or Additive applied to ORIMULSION and conditions | | Viscosity @ shear rate of 100 $sec^{-1}$ (centipoise) |
|---|---|---|
| Applied Mixing | 300 rpm for 4 hours | 669 |
| Decrease pH | pH 1.67 | 564 |
| Add Solvent | 4.2 wt % Kerosene | 399 |
| Add Surfactant | 1.4 wt % TRITON RW-20 cationic | 346 |
| Add Salt | 2.8 wt % $CaCl_2$ | 790 |
|  | 1.4 wt % $FeCl_3$ |  |
| Add Flocculent | 1.4 wt % Betz 3395 | 3800 |
|  | 1.4 wt % Betz 3367L | 940 |
|  | 1.4 wt % Betz 3317L | 1185 |

As can be seen from the results summarized above, the Betz flocculants were most effective in increasing the viscosity of the ORIMULSION, thereby greatly reducing the ability of the emulsion to flow or disperse. The kerosene and TRITON RW-20 surfactant only slightly increased the viscosity and did not cause any phase separation in the emulsion.

The two inorganic salts, however, caused a significant separation of the water phase from the bitumen, which increased the viscosity. It is uncertain at this time whether the increased viscosity was caused by a phase inversion, or merely a phase separation.

Applied mixing had the effect of thickening the emulsion, thereby increasing the viscosity. Lowering the pH also caused an increase in the viscosity of the ORIMULSION.

The methods and additives tested are useful, since only small quantities of each additive need be used to produce the increased viscosity, and the resulting retardation of flowability and dispersibility of the ORIMULSION emulsion. Further, each of the additives is non-toxic, and the methods do not adversely affect the environment either. This can help keep financial and environmental costs of cleaning spills of this fuel lower.

Each of these methods can be applied to spills immediately after a spill occurs. The amounts added can be adjusted for effectiveness on site, depending on the exact composition of the ORIMULSION spilled. Once the phases of the emulsion are cleaned up as much as possible, the recovered material can be reformulated by appropriate processes including applying additives or adjusting conditions for reuse.

While a specific embodiment of the invention has been described in detail to illustrate the application of the principles of the invention, it will be understood that the invention may be embodied otherwise without departing from such principles.

I claim:

1. A method for increasing the viscosity of a fossil fuel bitumen-in-water emulsion to retard the dispersion of the emulsion in sea water, the method comprising:

providing a first amount of the fossil fuel bitumen-in-water emulsion in the presence of a second amount of sea water which is greater than the first amount and substantially free of alcohol;

rapidly mixing the first amount sufficient to increase the viscosity of the fossil fuel bitumen-in-water emulsion for making the fossil fuel bitumen-in-water emulsion less prone to dispersion in the second amount of sea water.

2. A method according to claim 1, wherein the bitumen-in-water emulsion is composed of about 70% bitumen and about 30% water and a small quantity of additives selected from the group consisting of oil, surfactant, salt and flocculant.

3. A method for increasing the viscosity of a fossil fuel bitumen-in-water emulsion for retarding the dispersion of the fossil fuel bitumen-in-water emulsion in sea water, the method comprising:

providing a first amount of the fossil fuel bitumen-in-water emulsion in the presence of a second amount of sea water which is greater than the first amount and substantially free of alcohol;

providing an additive to the first amount sufficient to increase the viscosity of the fossil fuel bitumen-in-water emulsion for making the fossil fuel bitumen-in-water emulsion less prone to dispersion in the second amount of sea water.

4. A method according to claim 3, wherein the additive comprises an inorganic salt.

5. A method according to claim 4, wherein the inorganic salt is selected from the group consisting of $CaCl_2$ and $FeCl_3$.

6. A method according to claim 3, wherein the additive comprises a flocculant.

7. A method according to claim 3, wherein the additive comprises a cationic surfactant.

8. A method according to claim 3, wherein the bitumen-in-water emulsion is composed of about 70% bitumen and about 30% water and a small quantity of additives selected from the group consisting of oil, surfactant, salt and flocculent.

9. A method for increasing the viscosity of a fossil fuel bitumen-in-water emulsion for retarding the dispersion of the fossil fuel bitumen-in-water emulsion in sea water, the method comprising:

providing a first amount of the fossil fuel bitumen-in-water emulsion having a pH of about 8 in the presence of a second amount of sea water which is greater than the first amount and substantially free of alcohol;

providing an additive to the first amount sufficient to lower the pH of the fossil fuel bitumen-in-water emulsion to a pH of less than 2.0 and increase the viscosity of the fossil fuel bitumen-in-water emulsion for making the fossil fuel bitumen-in-water emulsion less prone to dispersion in the second amount of sea water.

10. A method according to claim 9, wherein the bitumen-in-water emulsion is composed of about 70% bitumen and about 30% water and a small quantity of additives selected from the group consisting of oil, surfactant, salt and flocculant.

* * * * *